US010979580B2

(12) United States Patent
Tomiie (10) Patent No.: US 10,979,580 B2
(45) Date of Patent: Apr. 13, 2021

(54) IMAGE PROCESSING APPARATUS CAPABLE OF EXTENDING FUNCTION, AND IMAGE FORMING APPARATUS PROVIDED WITH THE SAME (71) Applicant: KYOCERA Document Solutions Inc., Osaka (JP)

(72) Inventor: Norio Tomiie, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/800,379

(22) Filed: Feb. 25, 2020

(65) Prior Publication Data
US 2020/0274978 A1    Aug. 27, 2020

(30) Foreign Application Priority Data

Feb. 27, 2019  (JP) .............................. JP2019-034504

(51) Int. Cl.
*H04N 1/00* (2006.01)
*G06K 7/14* (2006.01)

(52) U.S. Cl.
CPC ....... *H04N 1/00395* (2013.01); *G06K 7/1417* (2013.01); *H04N 1/00334* (2013.01); *H04N 1/00801* (2013.01)

(58) Field of Classification Search
CPC ........... H04N 1/00395; H04N 1/00801; H04N 1/00803; H04N 1/00334; H04N 1/4413; G06K 7/1417
See application file for complete search history.

(56) References Cited

U.S. PATENT DOCUMENTS 5,367,148 A * 11/1994 Storch ..................... G06F 11/14
235/375
10,853,610 B2 * 12/2020 Shen ................ G06K 19/06037
2003/0094494 A1 * 5/2003 Blanford .................. G06K 7/14
235/462.07

(Continued)

FOREIGN PATENT DOCUMENTS

JP    2004-213469 A    7/2004
JP    2011-166654 A    8/2011

(Continued)

*Primary Examiner* — Ted W Barnes
(74) *Attorney, Agent, or Firm* — IP Business Solutions, LLC (57) ABSTRACT An image processing apparatus includes a storage device, an image reading device, a complementary image storage device, and a control device. The complementary image storage device stores a complementary image for complementing an incomplete two-dimensional code. The control device includes a processor and functions, through the processor executing a control program, as a detector, a synthesizer, and an analyzer. The detector detects, from the image obtained through the reading of the image reading device, the incomplete two-dimensional code. The synthesizer synthesizes the incomplete two-dimensional code detected by the detector and the complementary image stored in the complementary image storage device to generate a complete two-dimensional code. The analyzer analyzes the complete two-dimensional code generated by the synthesizer and activates an extension function.

7 Claims, 6 Drawing Sheets (56) References Cited

U.S. PATENT DOCUMENTS

| | | | | |
|---|---|---|---|---|
| 2004/0205261 | A1* | 10/2004 | Osada | G06F 21/10 |
| | | | | 710/8 |
| 2005/0038872 | A1* | 2/2005 | Ono | H04L 29/06 |
| | | | | 709/218 |
| 2009/0034723 | A1* | 2/2009 | Yanazume | H04N 1/32133 |
| | | | | 380/54 |
| 2009/0059264 | A1* | 3/2009 | Tsuji | H04N 1/00368 |
| | | | | 358/1.13 |
| 2010/0060923 | A1* | 3/2010 | Kakutani | H04N 1/00875 |
| | | | | 358/1.14 |
| 2012/0141660 | A1* | 6/2012 | Fiedler | G06K 19/06018 |
| | | | | 427/8 |
| 2013/0021364 | A1* | 1/2013 | Azuma | G09G 5/024 |
| | | | | 345/589 |
| 2014/0131458 | A1* | 5/2014 | Picard | G06K 1/121 |
| | | | | 235/494 |
| 2017/0124441 | A1* | 5/2017 | Picard | G06K 19/06037 |
| 2017/0200035 | A1* | 7/2017 | Teraura | G06K 19/06037 |
| 2019/0197279 | A1* | 6/2019 | Wang | G06K 7/1491 |
| 2019/0258839 | A1* | 8/2019 | Tokuchi | G06K 7/1417 |
| 2019/0369569 | A1* | 12/2019 | Olsen | G06F 3/14 |
| 2020/0175239 | A1* | 6/2020 | Herrera | G06K 19/06103 |
| 2020/0279142 | A1* | 9/2020 | Matsutani | G06K 19/06037 |

FOREIGN PATENT DOCUMENTS

| | | | | |
|---|---|---|---|---|
| JP | 2011166654 A | * | 8/2011 | |
| WO | WO-2013145224 A1 | * | 10/2013 | G06K 7/12 |

\* cited by examiner

BELOW IS THE QR CODE FOR ACTIVATING THE EXTENSION FUNCTION.
EXTENSION FUNCTION: OPTIONAL FORMAT
APPARATUS ID:12345678

M1  PLEASE OPERATE THE MFP HAVING THE ABOVE APPARATUS ID AND SET THE EXTENSION FUNCTION INSTALLATION MODE.
 THEREAFTER, PLEASE SELECT THE ABOVE INDICATED EXTENSION FUNCTION AS THE EXTENSION FUNCTION TO BE ACTIVATED, AND PLACE THIS SHEET ONTO THE CONTACT GLASS AND PERFORM SCANNING OPERATION.

IMAGE PROCESSING APPARATUS CAPABLE OF EXTENDING FUNCTION, AND IMAGE FORMING APPARATUS PROVIDED WITH THE SAME

INCORPORATION BY REFERENCE

This application claims priority to Japanese Patent Application No.2019-034504 filed on Feb. 27, 2019, the entire contents of which are incorporated by reference herein.

BACKGROUND

The present disclosure relates to an image processing apparatus and an image forming apparatus, and particularly relates to a technique for extending functions.

There are copiers and multifunction peripherals in which various extension functions for further improving functions of the apparatuses are prepared. For example, extension functions such as an optional font and security enhancement kit are implemented as software in the apparatuses, but are invalidated when the apparatuses are being shipped. That is, in initial states of the apparatuses, the extended functions are invalid and cannot be used in that states. To make the extension functions usable, a user needs to purchase a license key and perform activation of the extension function. As one of the methods for the user to purchase the license key, there is a method of purchasing by accessing a management server that manages the license key. The user accesses the management server to purchase the license key, and manually inputs the purchased license key through an operating device of the apparatus to extend the function of the apparatus.

In addition, as a method for simplifying the user's manual work, there has been proposed a technique of causing a scanner provided in the multifunction peripheral or the like to read a printed material on which a two-dimensional code such as a QR code (registered trademark) is printed, and using the two-dimensional code as the license key.

SUMMARY

A technique improved over the above technique is proposed as one aspect of the present disclosure.

An image processing apparatus according to an aspect of the present disclosure includes a storage device, an image reading device, a complementary image storage device, and a control device. The storage device stores, for each extension function, a two-dimensional code in which license information for activating an extension function is imaged. The image reading device reads an image. The complementary image storage device stores a complementary image for complementing an incomplete two-dimensional code from which the license information cannot be obtained. The control device includes a processor and functions, through the processor executing a control program, as a detector, a synthesizer, and an analyzer. The detector detects, from the image obtained through the reading of the image reading device, the incomplete two-dimensional code. The synthesizer synthesizes the incomplete two-dimensional code detected by the detector and the complementary image stored in the complementary image storage device. The analyzer compares a synthesized image synthesized by the synthesizer with the two-dimensional code stored in the storage device, and activates, upon determining that the synthesized image coincides with the two-dimensional code, an extension function corresponding to the two-dimensional code.

An image forming apparatus according to another aspect of the present disclosure includes the image processing apparatus according to the above-described one aspect of the present disclosure and an image forming device. The image forming device forms on a recording medium the image obtained through the reading of the image reading device.

DETAILED DESCRIPTION

Hereinafter, a description will be given of an image processing apparatus according to an embodiment of the present disclosure, with reference to the drawings. In this embodiment, an image forming apparatus will be taken up as an example of the image processing apparatus of the present disclosure.

Figure 1:
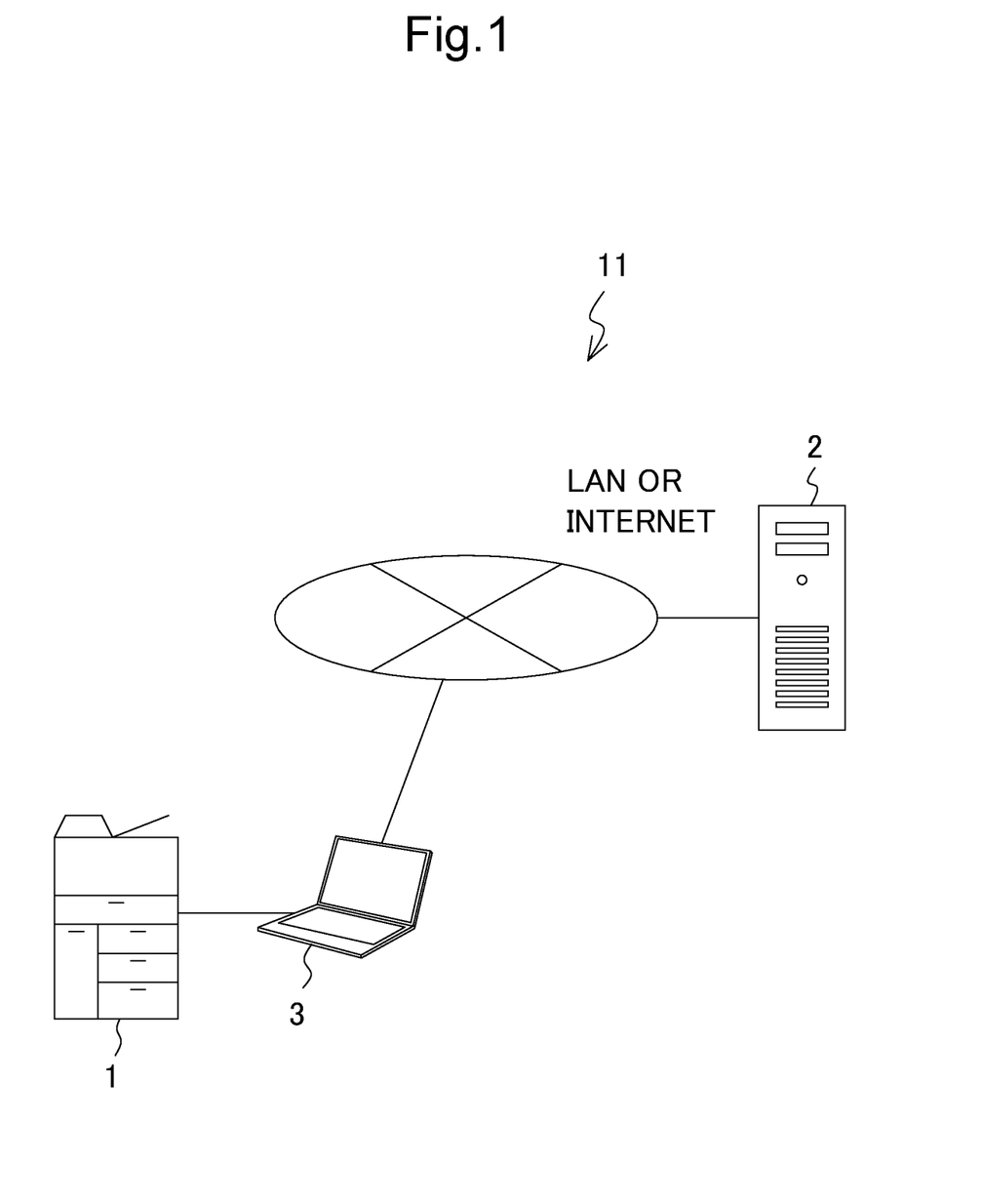
FIG. 1 is a diagram showing an overall configuration of extension function activating system including an image forming apparatus according to one embodiment of the present disclosure.

FIG. 1 is a diagram showing an overall configuration of extension function activating system including the image forming apparatus according to one embodiment of the present disclosure. The extension function activating system 11 includes an image forming apparatus 1, a server 2, and a terminal device 3 such as a personal computer. The image forming apparatus 1 is, for example, a multifunction peripheral having a scanner function and a printing function, and being capable of performing function extension.

The server 2 is a management server that manages a two-dimensional code in which license information for activating an extension function is imaged. The two-dimensional code is stored in a storage box formed of, for example, a hard disk drive (HDD). Hereinafter descriptions will be given by taking a QR code as an example of the two-dimensional code. The server 2 is operated by, for example, a sales company that sells the image forming apparatus 1.

The QR code that the server 2 manages is, for example, formed by converting the license information into an image: the license information is generated by combining a predetermined apparatus ID (such as a serial number) unique to the image forming apparatus 1 with an extension function number for identifying each extension function. A user purchases a license key represented by the QR code managed by the server 2 by the terminal device 3. The extension function number is one example of the extension function identification information recited in What is claimed is.

When the user wishes to activate any one of the extension functions at the image forming apparatus 1 that himself or herself is using, the user operates the terminal device 3 to access the server 2, makes a request of purchasing the license key of the extension function to be activated, and purchases the license key by following a predetermined procedure. In doing so, the user enters into the terminal device 3 the apparatus ID unique to the image forming apparatus 1, and transmits the input information (including the apparatus ID) together with the request (including information indicating the extension function to be activated) from the terminal device 3 to the server 2.

Figure 2A:
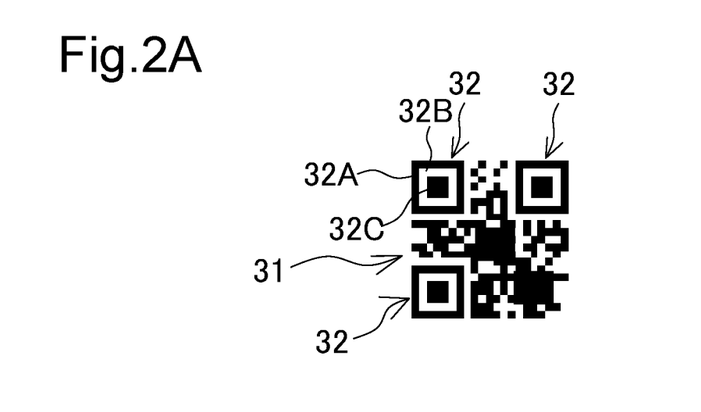
FIG. 2A is a diagram showing one example of a QR code in which license information is imaged.

Upon receiving the input information and the request, the server 2 generates the license information by combining the apparatus ID transmitted from the terminal device 3 with the extension function number indicating the extension function that the user wishes to activate, and generates the QR code in which the generated license information is imaged. FIG. 2A is a diagram showing one example of the QR code in which license information is imaged.

A positioning symbol 32 with a quadrilateral shape is arranged at each of three corners of the QR code 31. The positioning symbol 32 includes a first square 32A formed of a black part, a second square 32B formed of a white part formed within the first square 32A, and a third square 32C formed of a black part formed within the second square 32B. The QR code 31 is obtained by converting a sequence of numbers into an image as the license information: the sequence of numbers is, for example, a combination of "12345678" that indicates the apparatus ID and "1234" that indicates the extension function number. The license information is not limited to the sequence of numbers, but may be a character string.

Figure 2B:
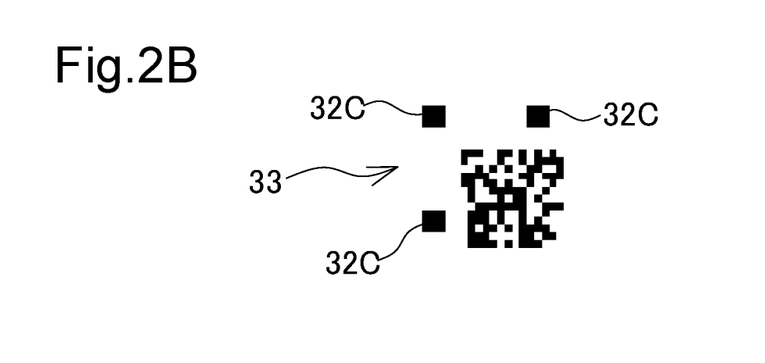
FIG. 2B is a diagram showing one example of an incomplete QR code.

Based on a predetermined rule, the server 2 generates from the generated QR code 31 an incomplete QR code: from the incomplete QR code itself, meaningful license information cannot be obtained. FIG. 2B is a diagram showing one example of the incomplete QR code.

An incomplete QR code 33 is formed by eliminating some parts of the QR code 31. The third squares 32C are included in the incomplete QR code 33, but the first squares 32A and image portions exist between two adjacent first squares 32A are eliminated from the QR code 31.

Figure 2C:
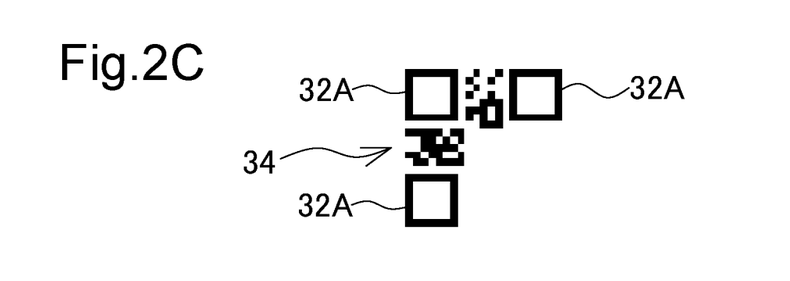
FIG. 2C is a diagram showing one example of an image having been deleted from the QR code in generating the incomplete QR code.

FIG. 2C is a diagram showing an elimination image having been eliminated from the QR code 31 in generating the incomplete QR code 33 from the QR code 31. An elimination image 34 includes the first squares 32A and the image portions existed between two adjacent first squares 32. In other words, the result of synthesizing the incomplete QR code 33 and the elimination image 34 makes the QR code 31.

The server 2 uses, for example, electronic mail, to transmit to the terminal device 3 a guide image that includes the generated incomplete QR code 33 and a message reporting an operation procedure for activating the extension function and other matter.

Figure 3:
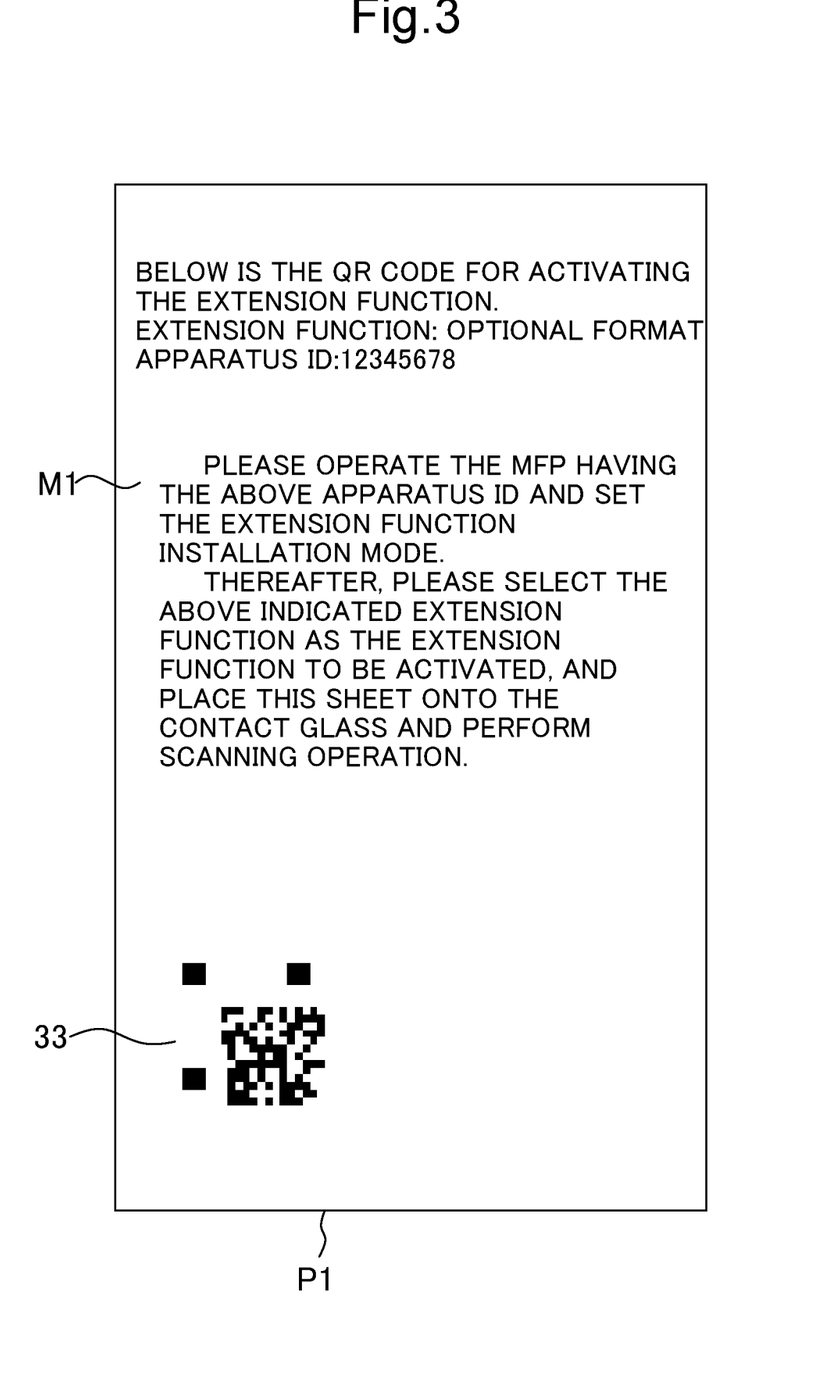
FIG. 3 is a diagram showing one example of a printed material on which the incomplete QR code is formed.

When the terminal device 3 receives the guide image transmitted from the server 2, the user operates the terminal device 3 to print the received guide image by, for example, a desired image forming apparatus (may be the image forming apparatus 1). The image forming apparatus follows the instruction and prints a printed material on which the incomplete QR code 33 is formed. With this procedure, the user can obtain the printed material on which the incomplete QR code 33 is formed. FIG. 3 is a diagram showing one example of a printed material P1 on which the incomplete QR code 33 is formed. The incomplete QR code 33 and a message M1 reporting the operation procedure for activating the extension function and other matter on the printed material P1. The printed material P1 is to be used to add the extension function of the image forming apparatus 1.

Alternatively, if the terminal device 3 is a portable terminal device provided with a display with LCD or the like, the user operates the terminal device 3 to cause the display to display the guide image. The image displayed on the display is to be used to add the extension function of the image forming apparatus 1.

Figure 4:
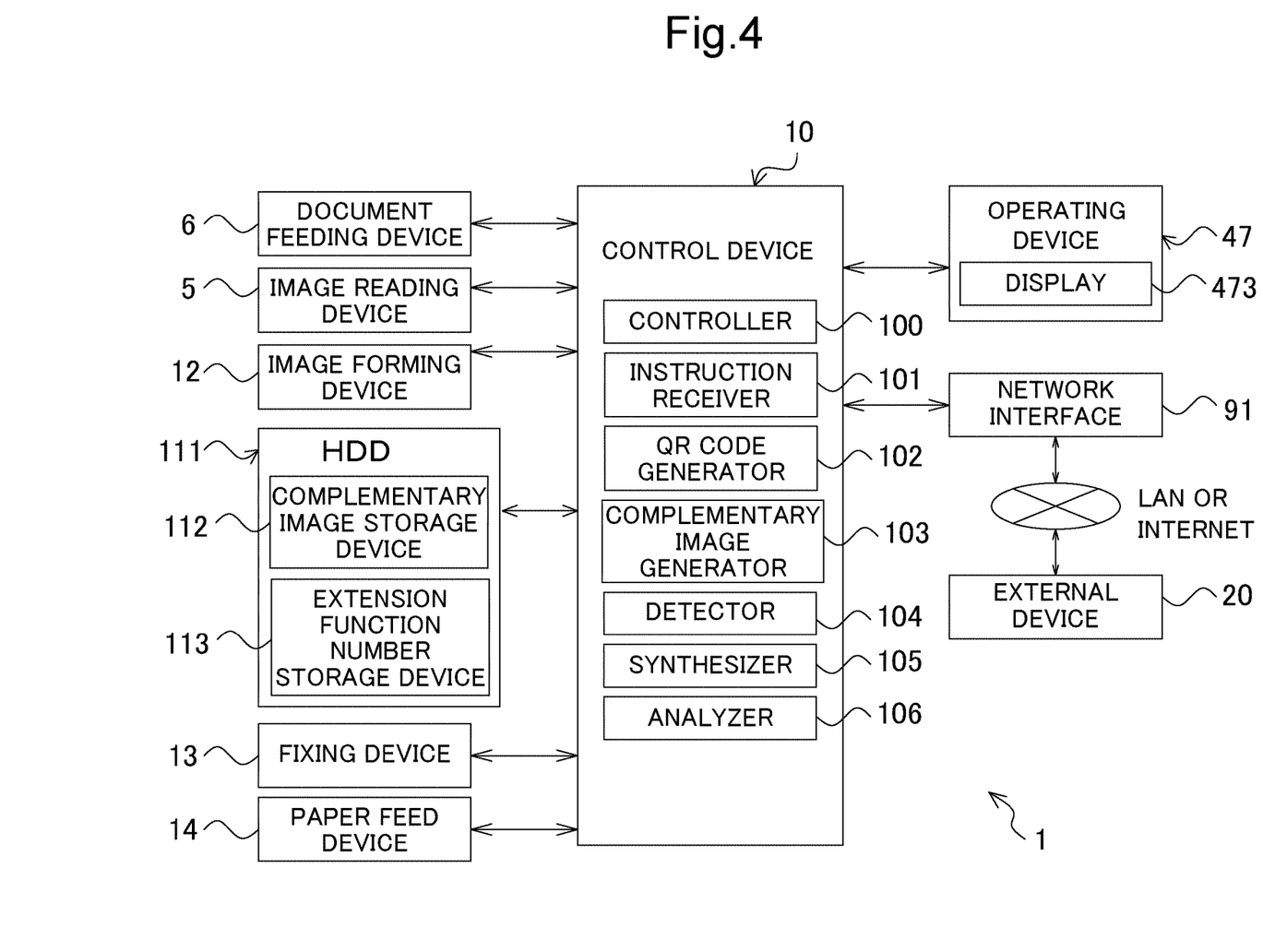
FIG. 4 is a functional block diagram schematically showing a main inner configuration of the image forming apparatus according to one embodiment of the present disclosure.

FIG. 4 is a functional block diagram schematically showing a main inner configuration of the image forming apparatus 1. The image forming apparatus 1 includes a control device 10, a document feeding device 6, an image reading device 5, an image forming device 12, an HDD 111, a fixing device 13, a paper feed device 14, an operating device 47, and a network interface 91.

A case where document reading operation is performed in the image forming apparatus 1 will be described. The image reading device 5 optically reads an image of a document fed by the document feeding device 6 or a document placed on a contact glass (not shown), and generates image data. The image data generated by the image reading device 5 is stored in an unillustrated image memory or the like.

A case where a image formation operation is performed in the image forming apparatus 1 will be described. Based on, for example, the image data generated by the document reading operation, and image data received from a computer being as an external device 20 (such as the terminal device 3) connected to the network, the image forming device 12 forms a toner image on a recording sheet being as the recording medium fed from the paper feed device 14.

The HDD 111 is a large-capacity storage device and includes a complementary image storage device 112 and an extension function number storage device 113. The complementary image storage device 112 stores a complementary image for complementing the incomplete QR code. That is, the complementary image storage device 112 stores the elimination image 34 shown in FIG. 2C as the complementary image.

The extension function number storage device 113 stores the extension function in association with the extension function number corresponding thereto. The extension function number is used to identify each of the extension functions. For example, the extension function number storage device 113 stores the extension function number "1234" in association with the extension function "optional format".

The fixing device 13 serves to apply heat and pressure to the recording sheet with the toner image is formed thereon by the image forming device 12 to fix the toner image onto the recording sheet. The recording sheet that has undergone the fixing is outputted to an unillustrated output tray. The paper feed device 14 has a paper feeding cassette.

The operating device 47 receives instructions from an operator, for operations and processing that the image forming apparatus 1 is capable of performing, such as an image forming operation execution instruction. The operating section 47 includes a display 473 for displaying operation guidance and so forth to the operator.

The display 473 is made up with for example LCD and has a touch panel function. When the operator touches, on the display 473, a button, a key, and so forth displayed, the operation instruction related to the image forming apparatus 1 is received at an instruction receiver 101 through the touch panel function.

The network interface 91 transmits and receives various kinds of data to and from the external apparatus 20 (for example the terminal device 3) located within the local area or on the Internet.

The control device 10 is formed of a processor, a random access memory (RAM), a read only memory (ROM), and an exclusive hardware circuit. The processor is, for example, a central processing unit (CPU), an application specific integrated circuit (ASIC), or a micro processing unit (n MPU). The control device 10 includes a controller 100, the instruction receiver 101, a QR code generator 102, a complementary image generator 103, a detector 104, a synthesizer 105, and an analyzer 106.

The control device 10 functions as the controller 100, the instruction receiver 101, the QR code generator 102, the complementary image generator 103, the detector 104, the synthesizer 105, and the analyzer 106, through the processor executing a control program stored in the HDD 111. Here, the controller 100, the instruction receiver 101, the QR code generator 102, the complementary image generator 103, the detector 104, the synthesizer 105, and the analyzer 106 may each be constituted in the form of a hardware circuit, instead of being performed according to the control program by the control device 10. This also applies to other embodiments, unless otherwise specifically noted.

The controller 100 collectively controls the image forming apparatus 1. The controller 100 is connected to the document feeding device 6, the image reading device 5, the image forming device 12, the HDD 111, the fixing device 13, the paper feed device 14, the operating device 47, and the network interface 91. The controller 100 performs driving controls of each of these components.

The instruction receiver 101 receives operation input from the user through the operating device 47. The instruction receiver 101 receives the instructions inputted into the operating device 47.

When the instruction receiver 101 receives, based on user's operation on the operating device 47, an instruction to set an extension function installation mode and selection of the extension function to be activated, the QR code generator 102 generates the license information by combining the predetermined apparatus ID unique to the image forming apparatus 1 with the extension function number (the extension function number for identifying the extension function selected by the user) stored in the extension function number storage device 113, and generates the QR code in which the license information is imaged. The generated QR code is stored in the HDD 111. The QR code for each of the extension functions may not be generated by the QR code generator 102; it may be stored in the HDD 111 when the image forming apparatus 1 is manufactured. The QR code generator 102 is one example of the two-dimensional code generator recited in What is claimed is.

The extension function installation mode is set by the controller 100 when for example the user performs a predetermined operation through the operating device 47 to input the setting instruction and when the instruction is received by the instruction receiver 101.

The complementary image generator 103 generates from the QR code the complementary image for complementing the incomplete QR code (to be synthesized with the incomplete QR code), and stores, in the complementary image storage device 11, the generated complementary image in association with the extension function represented by the QR code. If the QR code is the QR code 31 as shown in FIG. 2A, the incomplete QR code is the incomplete QR code 33 as shown in FIG. 21B, and the complementary image is the elimination image 34 shown in FIG. 2C.

Therefore, based on a rule corresponding to the aforesaid rule used when the server 2 generates the incomplete QR code 33, the complementary image generator 103 generates the elimination image 34 as the complementary image from the QR code 31 generated by the QR code generator 102.

The detector 104 detects from the document image obtained by the reading of the image reading device 5 the incomplete QR code while the extension function installation mode is being set. For example, when the image reading device 5 reads the image of the printed material P1 (FIG. 3) while the printed material P1 is being placed on the contact glass, the detector 104 detects the incomplete QR code 33 from the document image.

The incomplete QR code 33 has the third square 32C at each of the three corners. Therefore, the detector 104 detects the incomplete QR code 33 by searching for the third squares 32C at the three corners.

It is desirable to fix the position where the incomplete QR code 33 is formed on the printed material P1 in order to shorten the time required for the detection process by the detector 104. For example, as shown in FIG. 3, if a rule of forming the incomplete QR code 33 at the lower left corner area of the printed material P1 is determined, the area to be detected by the detector 104 can only be the lower left corner area and the upper right corner area of the document image instead of the entire document image, thereby reducing the detection time. The upper right corner area is also to be the detection target area because there are possibilities that the printed material P1 is placed upside down on the contact glass.

Here, as the incomplete QR code, the one without the first squares 32A and having the third squares 32C in the three corners is described as an example, but the incomplete QR code may be the one without the third squares 32C and having the first squares 32A. Of course, variations other than the above may be applicable, and any format may be used as long as the incomplete QR code can be detected. However, the incomplete QR code is preferable to have, at three corners thereof, at least one of the first squares 32A and the third squares 32C in terms of detection efficiency.

The synthesizer 105 synthesizes the incomplete QR code detected by the detector 104 and the complementary image stored in the complementary image storage device 112 to generate a QR code (completed QR code). For example, by synthesizing the incomplete QR code 33 and the elimination image 34, which is as a complementary image, the synthesizer 105 generates the QR code 31.

The analyzer 106 compares the QR code 31, which is the synthesized image synthesized by the synthesizer 105, with the two-dimensional code stored in the HDD 111, and upon determining that the QR code 31 coincides with the two-dimensional code, activates the extension function represented by the two-dimensional code.

Hereinafter, an example of processing performed by the image forming apparatus 1 according to the one embodiment of the present disclosure will be detailed based on a flowchart shown in FIG. 5. This processing is performed when the instruction receiver 101 receives user's selection of the extension function to be activated while the extension function installation mode is set.

At the start, the QR code generator 102 reads out from the extension function number storage device 113 the extension function number corresponding to the extension function received by the instruction receiver 101 (S1), generates the license information by combining the predetermined apparatus ID unique to the image forming apparatus 1 with the extension function number read out (S2), and generates the QR code 31 in which the generated license information is imaged (S3). If the QR code for each of the extension functions is stored in the HDD 111, the controller 100 performs the processing of reading the QR code corresponding to the extension function received by the instruction receiver 101 from the HDD 111 instead of performing the steps S2 and S3.

Then, based on the predetermined rule, the complementary image generator 103 generates from the QR code 31 generated by the QR code generator 102 the complementary image (the elimination image 34) (S4). The complementary image generator 103 stores the generated complementary image into the complementary image storage device 112 (S5). The processing ends thereafter.

Hereinafter, an example of processing relating to determining the QR code and to setting the extension function performed by the image forming apparatus 1 will be detailed based on a flowchart shown in FIG. 6. This processing is performed when the instruction receiver 101 receives an instruction to start scanning while the extension function installation mode is set.

When the instruction receiver 101 receives the instruction to start scanning based on user's operation on the operating device 47, the controller 100 causes the image reading device 5 to read an image of the document placed on the contact glass (S11). Therefore when the user places the printed material P1 on the contact glass before the scan starts, the image formed on the printed material P1 (that is, the image with the incomplete QR code 33) will be read by the image reading device 5. If the terminal device 3 is placed on the contact glass so that the image reading device 5 can read the display of the terminal device 3 (in a case of the portable terminal device), the image reading device 5 reads the image being displayed on the display of the terminal device 3 at S11.

Then, the detector 104 detects from the document image obtained by the reading of the image reading device 5 the incomplete QR code 33 (S12). When the controller 100 determines that the detector 104 has successfully detected the incomplete QR code 33 (YES at S13), the synthesizer 105 reads out the complementary image (the elimination image 34) stored in the complementary image storage device 112 (S14). In other words the synthesizer 105 reads out the complementary image generated at S4 (FIG. 5) from the complementary image storage device 112. That is, the user completes the series of processing shown in FIG. 5, and subsequently executes the series of processing shown in FIG. 6.

However, the configuration may be arranged so that based on user's operation on the operating device 47, the instruction receiver 101 receives the instruction to designate the extension function to be extended together with the start of scanning, and the synthesizer 105 reads out from the complementary image storage device 112 the complementary image corresponding to the designated extension function. In doing so, the user not necessarily has to finish the series of processing shown in FIG. 5 to subsequently execute the series of processing shown in FIG. 6. Time to complete a series of processes shown in FIG. 5 may be any time so long as it is before a series of processes shown in FIG. 6.

Then the synthesizer 105 synthesizes the incomplete QR code 33 detected by the detector 104 and the complementary image read out by the complementary image storage device 112 to generate the QR code (S15).

By comparing the QR code 31 generated by the synthesizer 105 with the QR code stored in the HDD 111, the analyzer 106 determines whether the analyzed QR code is the correct code (S17).

The analyzer 106 determines that the analyzed QR code is the correct code when the QR code 31 generated by the synthesizer 105 coincides with the QR code stored in the HDD 111 (YES at S17), and in this case performs a setting to activate the extension function associated with the QR code (S18). The processing ends thereafter. The analyzer 106 determines whether the QR code 31 generated by the synthesizer 105 coincides with the QR code stored in the HDD 111 by, for example, using a pattern matching technique.

In contrast, when the analyzer 106 determines that the analyzed QR code is not the correct code (NO at S17), the controller 100 causes the display 473 to display a message reporting that the QR code is not the correct code (S19). The processing ends thereafter.

When the controller 100 determines at S13 that the detector 104 is failed to detect the incomplete QR code 33 (NO at S13), the controller 100 displays on the display 473 a message reporting that the detection of the QR code 33 is failed (S20). The processing ends thereafter.

In the above embodiment, by using the printed material with the incomplete QR code formed thereon to activate the extension function, the user does not need to manually enter the license key. Accordingly, the work by the user can be simplified. Furthermore, according to the above embodiment, the completed QR code is analyzed inside the image forming apparatus 1 and does not appear outside, so the user and a third party cannot see it. What appears outside and is visible to the user and the third party is the incomplete QR code from which it is not possible to obtain meaningful license information by itself. In other words, the QR code to be distributed is incomplete and cannot be analyzed by itself. Therefore, for example, the user and the third party cannot create the QR code that can activate extension functions at multiple devices on their own only by purchasing the license key. Therefore, according to the above embodiment, it is possible to simplify the user work when inputting the license information and also prevent the illegal use of the extension function.

Figure 5:
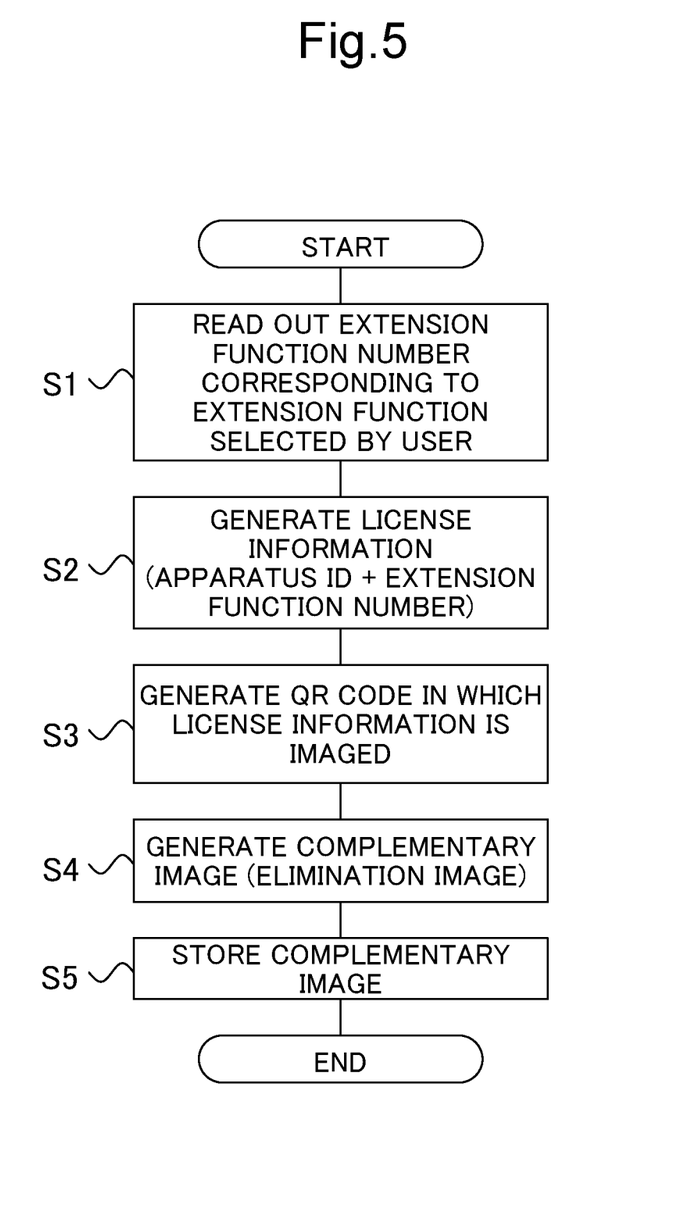
FIG. 5 is a flowchart showing one example of processing performed by the image forming apparatus according to one embodiment of the present disclosure.
Figure 6:
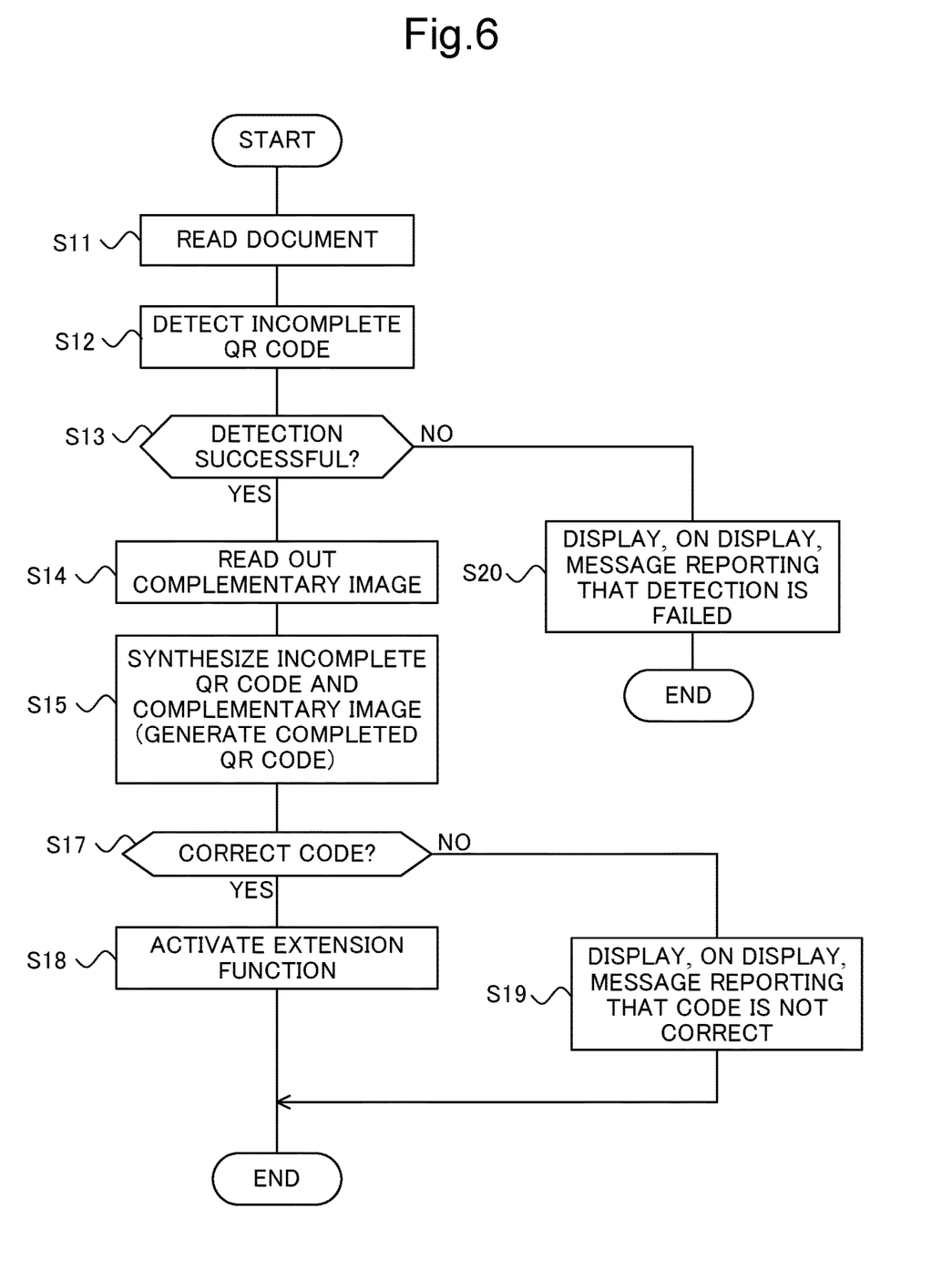
FIG. 6 is a flowchart showing one example of processing related to QR code determination and extension function setting performed by the image forming apparatus according to one embodiment of the present disclosure.

Further, as a modification of the above embodiment, the configuration may be arranged as follows: based on user's operation on the operating device 47, when the instruction receiver 101 receives the instruction to designate the extension function to be extended together with the start of scanning, the series of processing shown in FIG. 5 is performed and thereafter the series of processing shown in FIG. 6 is performed. In other words, the complementary image generator 103 does not generate the complementary image until the instruction to start scanning and the function designation instruction designating the function to be extended are received, and the complementary image is not stored in the complementary image storage device 112: after the instruction to start scanning and the function designation instruction designating the function to be extended are received, the complementary image is generated by the complementary image generator 103 and is stored in the complementary image storage device 112. Thereafter, the synthesizer 105 synthesizes the incomplete QR code 33 and the complementary image to generate the synthesized image, and when the analyzer 106 determines that the synthesized image coincides with the QR code stored in the HDD 111, the extension function corresponding to the QR code is activated. Since in this manner there is no complementary image and completed QR code until the instruction to start scanning and the function designation instruction designating the function to be extended are received from the user, illegal use of the extension function can be more reliably prevented.

The above embodiment details the case where, when the instruction receiver 101 receives the selection of the extension function to be activated from the user while the extension function installation mode is being set, the complementary image generator 103 generates the complementary image and the generated complementary image is stored in the complementary image storage device 112. As another embodiment, each of the complementary images associated with each of the extension functions may be stored in advance in the complementary image storage device 112.

In the general technique that uses the license key for activating the extension function, for example, if the license key is of only a number, it is easy to decipher and may be abused. However, complicating the license key to prevent abuse reduces the convenience of the user who manually enters the license key. Even if a two-dimensional code such as a QR code is simply used to activate the extension function, as the license key, the two-dimensional code may be decrypted and may be abused. However, according to each of the above embodiments, unauthorized use of the extension function can be prevented while simplifying the user work in inputting the license information.

The disclosure is not limited to the foregoing embodiments but may be modified in various manners. Although the image processing apparatus and image forming apparatus according to the disclosure are exemplified by the multi-function peripheral in the foregoing embodiment, the example is merely illustrative. Other image processing apparatus and image forming apparatus having the scanner function may be used.

The configuration and processing described in the above embodiments with reference to FIGS. 1 to 6 are merely exemplary, and not limit the present disclosure to the above particular configuration and processing.

While the present disclosure has been described in detail with reference to the embodiments thereof, it would be apparent to those skilled in the art the various changes and modifications may be made therein within the scope defined by the appended claims.

What is claimed is:

1. An image processing apparatus comprising:
 a storage device that stores, for each extension function, a two-dimensional code in which license information for activating an extension function is imaged;
 an image reading device that reads an image;
 a complementary image storage device that stores a complementary image for complementing an incomplete two-dimensional code from which the license information cannot be obtained; and
 a control device that includes a processor and functions, through the processor executing a control program, as:
  a detector that detects, from the image obtained through the reading of the image reading device, the incomplete two-dimensional code;
  a synthesizer that synthesizes the incomplete two-dimensional code detected by the detector and the complementary image stored in the complementary image storage device; and
  an analyzer that compares a synthesized image synthesized by the synthesizer with the two-dimensional code stored in the storage device, and activates, upon determining that the synthesized image coincides with the two-dimensional code, an extension function corresponding to the two-dimensional code.

2. The image processing apparatus according to claim 1, wherein
 the control device further functions, through the processor executing the control program, as a two-dimensional code generator that generates the two-dimensional code by combining a predetermined apparatus ID unique to the image processing apparatus with extension function identification information for identifying each extension function, and
 the two-dimensional code generated by the two-dimensional code generator is stored in the storage device.

3. The image processing apparatus according to claim 1, wherein
 the control device further functions, through the processor executing the control program, as a complementary image generator that generates the complementary image from the two-dimensional code and stores the generated complementary image in the complementary image storage device.

4. The image processing apparatus according to claim 1, further comprising an operating device through which a user inputs an image reading instruction and a function designation instruction that designates a function to be extended,
 wherein the control device further functions, through the processor executing the control program, as:
  an instruction receiver that receives the image reading instruction and the function designation instruction inputted through the operating device;
  a two-dimensional code generator that generates the two-dimensional code by combining a predetermined apparatus ID unique to the image processing apparatus with extension function identification information for identifying each extension function;
  a complementary image generator that generates the complementary image from the generated two-dimensional code; and
  a controller that controls operation of the image processing apparatus,
 wherein when the instruction receiver receives the image reading instruction and the function designation instruction, the two-dimensional code generator generates the two-dimensional code by combining the extension function identification information corresponding to the function that the function designation instruction indicates with the apparatus ID, the storage device stores the generated two-dimensional code, the complementary image generator generates the complementary image from the generated two-dimensional code, the complementary image storage device stores the generated complementary image, and the controller causes the image reading device to read a document prepared at the image reading device,
 the synthesizer synthesizes the incomplete two-dimensional code detected by the detector from the image obtained through the reading of the image reading device and the complementary image stored in the complementary image storage device to generate the synthesized image, and
 the analyzer activates, upon determining that the synthesized image coincides with the two-dimensional code, an extension function corresponding to the two-dimensional code.

5. The image processing apparatus according to claim 1, wherein the two-dimensional code is a QR code (a registered trademark).

6. The image processing apparatus according to claim 5, wherein
- a quadrilateral positioning symbol placed at each of three corners of the QR code includes a first square formed of a black part, a second square formed of a white part formed within the first square, and a third square formed of a black part formed within the second square, and
- the incomplete two-dimensional code has, at three corners thereof, at least one of the first square and the third square.

7. An image forming apparatus comprising:
the image processing apparatus according to claim 1; and
an image forming device that forms on a recording medium the image obtained through the reading of the image reading device.

\* \* \* \* \*